(12) United States Patent
Ekpenyong et al.

(10) Patent No.: US 10,289,997 B2
(45) Date of Patent: May 14, 2019

(54) GUIDED DOCUMENT IMAGE CAPTURE AND PROCESSING

(71) Applicant: NCR Corporation, Duluth, GA (US)

(72) Inventors: Olufisayo Adebanke Ekpenyong, Kitchener (CA); Michael Gardi, Waterloo (CA)

(73) Assignee: NCR Corporation, Atlanta, GA (US)

( * ) Notice: Subject to any disclaimer, the term of this patent is extended or adjusted under 35 U.S.C. 154(b) by 113 days.

(21) Appl. No.: 15/416,403

(22) Filed: Jan. 26, 2017

(65) Prior Publication Data
US 2018/0211243 A1    Jul. 26, 2018

(51) Int. Cl.
| | |
|---|---|
| H04N 5/235 | (2006.01) |
| H04N 5/262 | (2006.01) |
| G06Q 20/32 | (2012.01) |
| G06T 7/13 | (2017.01) |
| H04N 5/232 | (2006.01) |
| G06Q 20/18 | (2012.01) |
| G06Q 20/04 | (2012.01) |
| G06K 9/00 | (2006.01) |
| G06K 9/20 | (2006.01) |

(52) U.S. Cl.
CPC ....... *G06Q 20/327* (2013.01); *G06K 9/00456* (2013.01); *G06K 9/2081* (2013.01); *G06Q 20/042* (2013.01); *G06Q 20/18* (2013.01); *G06T 7/13* (2017.01); *H04N 5/232* (2013.01); *H04N 5/23216* (2013.01); *H04N 5/23222* (2013.01)

(58) Field of Classification Search
CPC .......... H04N 5/23216; H04N 5/23222; G06Q 20/042; G06Q 20/0425; G06Q 20/16; G06Q 20/18; G06Q 20/20; G06K 9/00442; G06K 9/20; G06K 9/2081; G06T 7/13
See application file for complete search history.

(56) References Cited

U.S. PATENT DOCUMENTS

| | | | |
|---|---|---|---|
| 8,699,779 B1 * | 4/2014 | Prasad ...................... | G06K 9/32 382/137 |
| 9,148,557 B2 * | 9/2015 | Yasuda .............. | H04N 5/23219 |
| 9,747,509 B2 * | 8/2017 | Eid ......................... | G06K 9/036 |
| 9,818,090 B1 * | 11/2017 | Bueche, Jr. ............ | G06Q 40/02 |
| 2014/0247325 A1 * | 9/2014 | Wu .................... | H04N 5/23206 348/39 |

* cited by examiner

*Primary Examiner* — Ngoc Yen T Vu
(74) *Attorney, Agent, or Firm* — Schwegman, Lundberg & Woessner

(57) ABSTRACT

Video frames of a document are captured. The edges of the document are identified from the frames as they appear within a field of view of a camera and a document rectangle for the document is tracked within the field of view. An area of the document determined from the frames is compared against the available area of the camera preview mode and a larger superimposed guiding rectangle is displayed as a guide within the camera preview mode. When a frame for the document is detected as having document edges that substantially fit within the guiding rectangle, the guiding rectangle is removed and an optimal image of the document is captured for subsequent downstream document image processing.

19 Claims, 4 Drawing Sheets

GUIDED DOCUMENT IMAGE CAPTURE AND PROCESSING

BACKGROUND

Increasingly consumers are conducting financial transactions and performing business accounting through consumer-operated devices, such as: Self-Service Terminals (SSTs) without the assistance of a clerk and mobile device owned/operated by the consumers.

For example, it is fairly common for a consumer to now use a mobile device, such as a phone to take a picture of a check and deposit that check with a bank using a mobile application. A variety of issues are usually encountered in this process.

However, this process will typically not work well with larger documents or financial instruments, such as invoices that can be 8½ by 11 inches. Additionally, larger documents typically require better image quality than do smaller documents, such as checks for purposes of performing Optical Character Recognition (OCR) on the documents. This means that larger documents require higher resolution images for OCR than what is conventionally used for check image capture in the industry.

However, even with traditional check image capture and processing applications, there are still issues that have yet to be overcome in the industry. For example, the consumer is usually required to manually align the check image in a screen of the mobile device and press a button to snap a picture of the check; the check image is then sent from the mobile application to the bank. This can create a variety of problems that prevents the bank from being able to process the check information from the consumer-captured image, such as: 1) a poor angle used by the consumer in taking the image, 2) the image does not include all edges of the check information resulting in some information being unavailable in the check image, 3) the lighting when the image was taken was of poor quality such that the check information cannot be processed, 4) the consumer's hand was shaking when the photo was taken for whatever reason (consumer traveling, etc.) resulting in a blurred check image.

Typically, the consumer is unaware of what the problem was and the bank just reports a non-meaningful error back to the consumer that the check cannot be deposited with the bank. The consumer may or may not try again; usually the consumer thinks that something is wrong with the check itself and may call the entity that provided the check or may personally visit a bank branch in an attempt to deposit the check. Any of these options are time consuming and are undesirable situations for both the consumer and the bank.

Additionally, with traditional mobile check capture the screen orientation is preset on the mobile device in landscape mode. For larger documents, this may not always be the proper orientation that would enable the user to take a larger sized image. Further, many times the user is not aware that changing the orientation would allow the user to move closer to the image and get a better quality image. Another issue is that the consumer's camera may be too close or too far from the check; if too close some areas of the check are missing in the captured image, and it too far the quality of the captured image may be inadequate for subsequent image processing.

SUMMARY

In various embodiments, methods and a system for document image capture and processing is presented.

According to an embodiment, a method for document image capture and processing is provided. Specifically, edges that define a document image for a document are dynamically tracked within a field of view of a camera. Next, a guiding rectangle is derived that substantially outlines an area of the field of view. Then, the guiding rectangle is superimposed on a display that is presenting the field of view. Finally, the guiding rectangle is removed from presentation on the display when the edges of the document image substantially align with the guiding rectangle.

DETAILED DESCRIPTION

Figure 1:
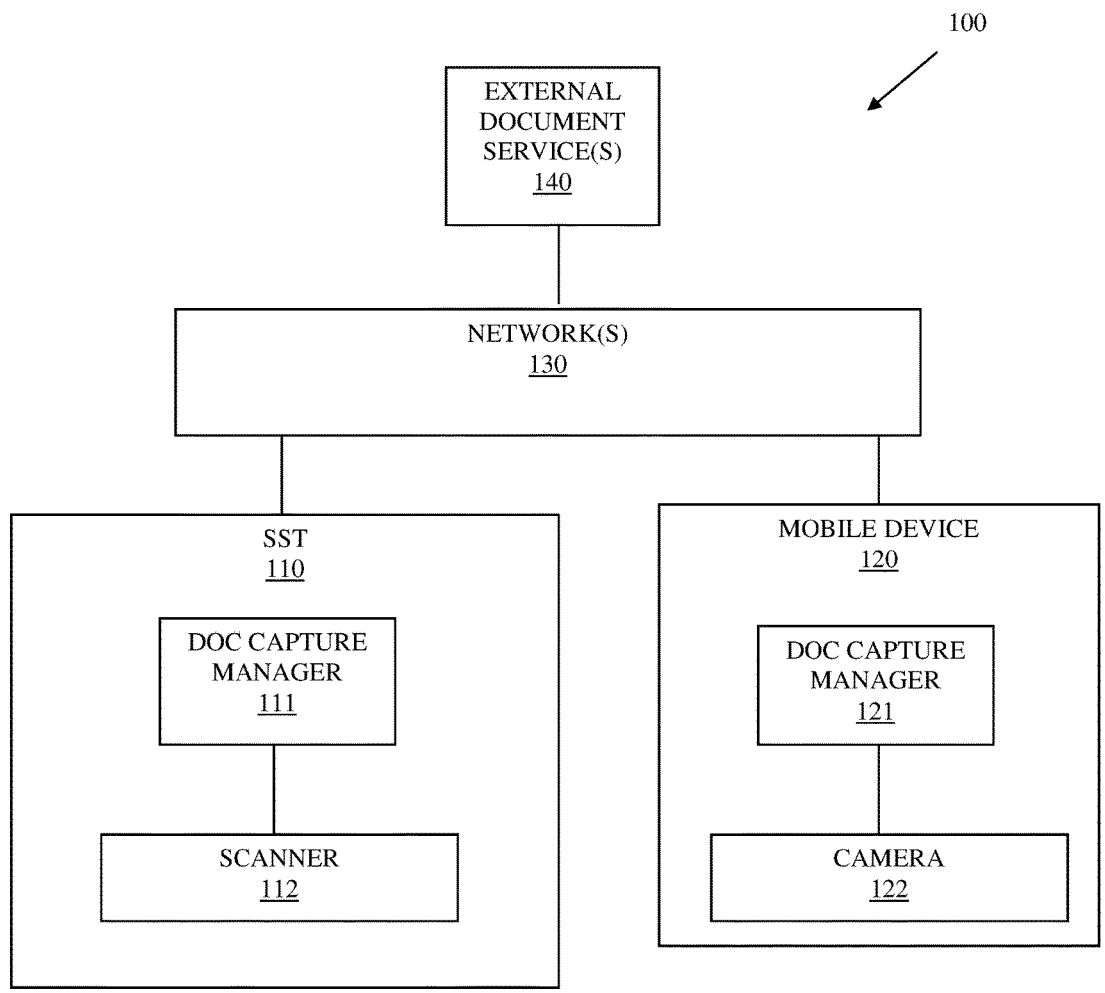
FIG. 1 is a diagram of a system for automatic document image capturing and processing, according to an example embodiment.

FIG. 1 is a diagram of a system 100 for automatic document image capturing and processing, according to an example embodiment. The various components are illustrated and the arrangement of the components is presented for purposes of illustration only. It is to be noted that other arrangements with more or less components are possible without departing from the automatic document image capturing and processing presented herein and below.

The system 100 includes one or more of: a Self-Service Terminal (SST) 110 and a mobile device 120. That is, either a SST 110 or a mobile device 120 can be present in the system or both can be present.

The SST 110 includes a document capture manager 111 and a scanner 112 (stationary or portable and interfaced to the SST 110). The mobile device 120 includes a document capture manager 121 and an integrated camera 122.

The SST 110 and/or mobile device 120 connect through one or more networks 130 (wired, wireless, or a combination of wired and wireless) to one or more external document services 140.

The external document services 140 provide services relevant to document images transferred from the document detectors 111 and 121. For example, banking services, accounting services, transaction processing services, and others. The external document services 140 also perform Optical Character Recognition (OCR) on document images provided by the document detectors 111 and 121.

For purposes of the discussion that follows, the processing is discussed from the perspective of the mobile device 120, the document capture manager 121, and the camera 122. Although it is to be noted that the described processing that follows applies equally and correspondingly to the SST 110, document capture manager 111, and scanner 112 with the modification moving the document instead of the mobile device 120 when the scanner 112 is not a portable scanner of the SST 110.

During operation of the mobile device 120, a mobile application that executes on one or more processors of the mobile device includes the document capture manager 121.

A user/operator of the mobile device 120 initiates the mobile application and selects an option for capturing an image of a large document (such as an invoice, a receipt, a check, a government issued photo identification card, a credit card, a debit card, a loyalty card, and the like). A large document is meant to be greater than a typical check size and typically 8½ inches by 11 inches. When the option for capturing an image of the document is selected, an integrated camera 122 of the mobile device 120 is initiated and the camera 122 begins recording video available through the lens of the camera 122 for automated document image capturing and processing.

As the camera 122 is initiated, the document capture manager 121 is initiated by the mobile application. The document capture manager 121 receives the video as the video frames are being recorded by the camera 122.

The document capture manager 121 processes in seven phases for: 1) determining when to automatically activate the camera 122 for capturing a still image of a document, 2) determining the rectangular edges of the document from frames of the video, 3) calculate an optimal area for an optimal image of the document based on an area calculated for the rectangular edges of the document and an available camera preview area present in the field of view of the camera 122 while the camera 122 is in a camera preview mode of operation, 4) visually superimpose on a screen rendered on a display of the device 120 a guiding rectangle that maximizes the available camera preview area and providing the guiding rectangle as an instruction to the user to move the camera further back from its present position or move the camera closer to the document to align the edges of the document within the guiding rectangle, 5) determining when a top-left most edge of the document aligns with a top-left most edge of the guiding rectangle and when a calculated center of the document aligns with a center of the guiding rectangle, 6) removing the guiding rectangle when the document viewed in the camera preview mode aligns within the guiding rectangle in 5), and 7) automatically activating the camera 122 to take a still and calculated optimal document image or displaying a button to press to activate the camera 122 and capture a still and calculated optimal document image.

It is to be noted that the document capture manager 121 may be part of a mobile application (app) that processes on the mobile device 120, such that when the application is accessed phase one begins immediately when the application user-interface appears for user interaction.

In phase one processing, the document capture manager 121, as soon as it is initiated, begins processing frames of images that are being captured by the camera 122 for determining within a few seconds (approximately 1 to 3 seconds) the frames per second (FPS) that the camera 122 is capturing video of the document as the user operator maneuvers the camera lens over the document. When phase one begins, the camera 122 is in a camera preview mode of operation where the user is operating the camera 122 by viewing the display of the mobile device 120; this display representing the field of view that the lens of the camera is capturing while the user is operating the camera 122. This first few seconds also allows for time to account for the time it takes the consumer from selecting the option to capture an image of the document and to then steady the camera over the document for which an image is to be taken.

During this time images of the document appear in the frames, the document capture manager 121 identifies the document edges (e.g., the perimeter lines and corners of the document identified by rectangles).

When a frame is processed, the document capture manager 121 determines from the frame a perimeter rectangle that defines the outer edges of the document. The area inside the rectangle represents the "region of interest." The region of interest includes the pixel values that are to be processed downstream by the external document service(s) for Optical Character Recognition (OCR) and additional automated downstream processing for automatically performing one or more operations on behalf of the user Next (phase two), the document capture manager 121 calculates a first width-to-height ratio of the rectangular edges for the document without regard to the available area of the field of view for the camera while in camera preview mode. The document capture manager 121 also calculates an area of the rectangle defined by the width times the height.

Once the width-to-height ratios are calculated and the area for the associated document rectangle are calculated for the document image that appears in the camera preview mode, phase three calculates the optimal size of an optimal area for capturing an optimal document image based on the length and width available in the field-of-view for the camera while in the camera preview mode. This area is referred to as the camera preview area and a height and width for a guiding rectangle defined to substantially encompass the available camera preview area.

In phase 4, the existing user-defined document edges and corresponding document image is known (as the document image present in the camera preview mode and detected from the frames) and the optimal available space for capturing an optimal image is known (as the camera preview area along with derived guiding rectangle that substantially includes all or most of the camera preview area). The camera preview area is modified to superimpose on the user display of the device 120 the guiding rectangle. This illustrates to the user that the user should move the device 120 (or the document in the case of a stationary camera/scanner 112) closer to or further away from the document. This causes the field of view for the camera preview mode to substantially fill up with just an image of the document and provides an optimal distance between the lens of the camera 122 and the document for capturing an optimal image of the document.

In phase 5, as the user is moving the device 120 (or document in the case of a fixed camera/scanner 112), the document capture manager 121 is dynamically monitoring from the frames the movement of the detected top left corner of the document with respect to the top left corner of the superimposed guiding rectangle. The document capture manager 121 also dynamically monitors from the frames the movement of a center of the document being presented within the camera preview mode relative to a center of the guiding rectangle superimposed within the camera preview on the display of the mobile device 120. When the top left corner of the document and the center of the document is detected to be within a preconfigured tolerance (pixel distance) with the top left corner of the guiding rectangle and the center of the guiding rectangle, phase 6 begins.

In phase 6, the guiding rectangle is removed from the display and in phase 7 two options can occur. In the first option, the document capture manager 121 automatically captures an optimal still image of the document without any user interaction. In the second option, a soft button is displayed on the display of the mobile device to the user and superimposed over part of the displayed image of the document; this is an indication to the user to press the displayed button for activating the camera 122 and capturing the optimal still image of the document.

Once the optimal image of the document is captured, the document capture manager 121 may automatically send the optimal image to a downstream application for subsequent image processing, such as OCR and transaction processing relative to content detected by the OCR processing.

One now appreciates how larger documents (8½ inches by 11 inches) can be processed by a document capture manager 121 or 111 for automatic guided device capture for purposes of capturing a complete, optimal, and more accurate document image. This ensures that subsequent document processing for OCR and automated user transactions by external document services 140 can process with less errors and improved accuracy/efficiency.

In an embodiment, the mobile device 120 is a phone.

In an embodiment, the mobile device 120 is a tablet computer.

In an embodiment, the mobile device 120 is a wearable processing device.

In an embodiment, the mobile device 120 is a network-connected camera.

In an embodiment, the mobile device 120 is a laptop computer.

In an embodiment, the mobile device 120 is an intelligent appliance having a network addresses and processing capabilities such that it is capable of being part of the Internet of Things (IoTs).

In an embodiment, the SST 110 is an Automated Teller Machine (ATM).

In an embodiment, the SST 110 is a kiosk.

In an embodiment, the SST 110 is a self-service checkout station.

In an embodiment, the SST 110 is a Point-Of-Sale (POS) terminal operated by a clerk on behalf of customers.

In an embodiment, the document is a large document that is larger than a consumer identification or credit card. In an embodiment, the document is larger than or equal to letter size (8½ inches by 11 inches). In an embodiment, the document is a consumer invoice.

These and other embodiments are now discussed with reference to the FIGS. 2-4.

Figure 2:
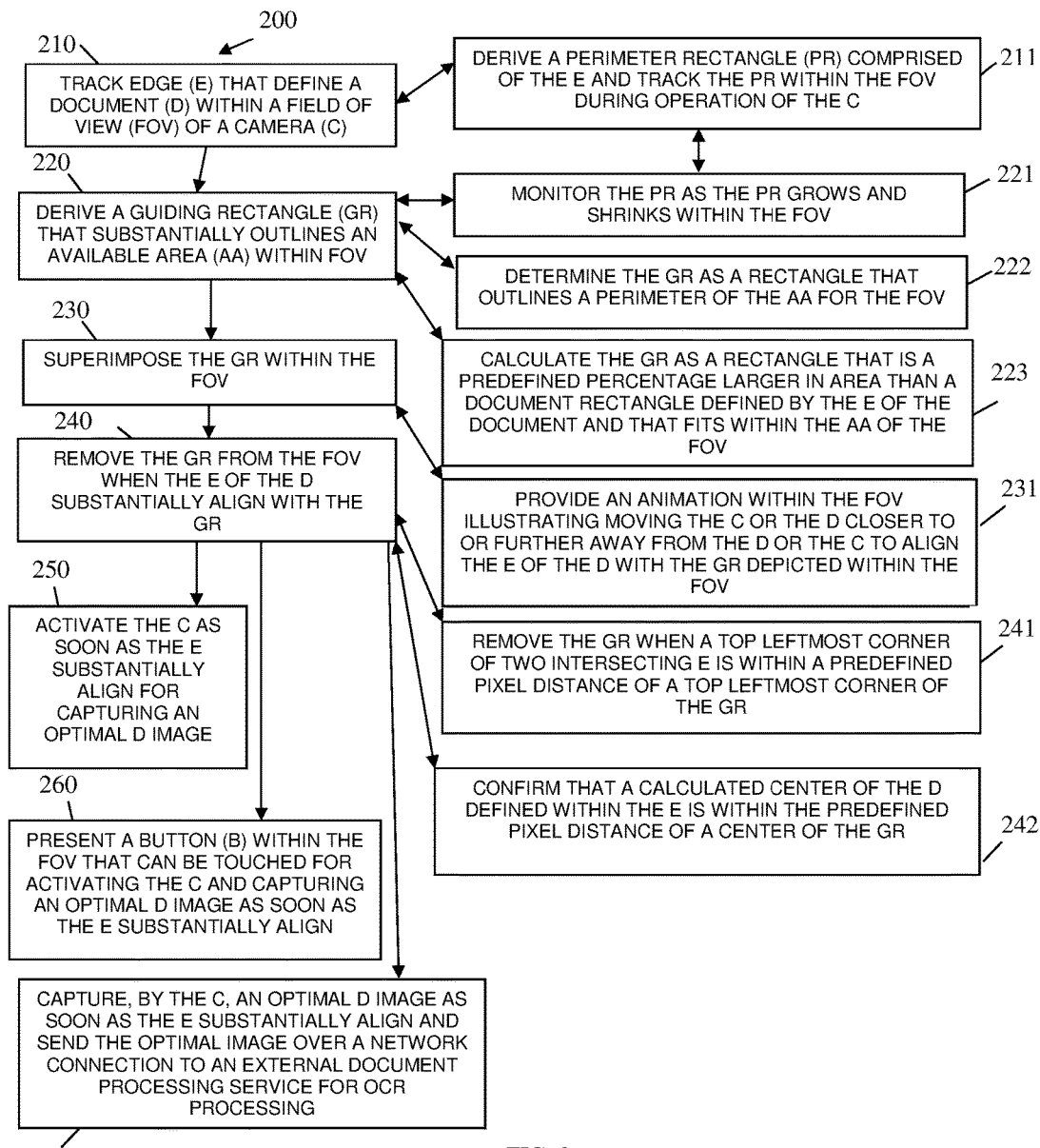
FIG. 2 is a diagram of a method for automatic document image capturing and processing, according to an example embodiment.

FIG. 2 is a diagram of a method 200 for automatic document capture and processing, according to an example embodiment. The software module(s) that implements the method 200 is referred to as a "image capture manager." The image capture manager is implemented as executable instructions programmed and residing within memory and/or a non-transitory computer-readable (processor-readable) storage medium and executed by one or more processors of a device. The processor(s) of the device that executes the image capture manager are configured and programmed to process the image capture manager. The image capture manager has access to one or more networks during its processing. The networks can be wired, wireless, or a combination of wired and wireless.

In an embodiment, the device that processes the image capture manager is the mobile device 120. In an embodiment, the mobile device 120 is one of: a phone, a tablet computer, a laptop computer, a wearable processing device, and a device that is part of the IoTs.

In an embodiment, the image capture manager is the document capture manager 121.

In an embodiment, the device that processes the image capture manager is the SST 110. In an embodiment, the SST 110 is one of: a POS terminal operated by a clerk, an ATM, and a kiosk.

In an embodiment, the image capture manager is the document capture manager 112.

The device that executes the image capture manager includes an integrated or interfaced camera. The camera includes video capabilities and still picture taking capabilities. In an embodiment, the camera is a scanner.

In an embodiment, image capture manager is a subcomponent or integrated module of an application processing on the device where that application is capable of network communication to a remote and external document service, such as a banking/financial service, retail service, accounting service, etc. The application having a user-facing interface for interacting with the user who is operating the device for capturing an image of a document and sending the document image to the external document service for further processing that at least includes OCR processing on the document image to identify document information from the document image.

In an embodiment, the image capture manager executes on a device that also performs the OCR on the document image. In these embodiments, the device that executes the image capture manager can be any of the above-mentioned devices or other devices, such as a standalone printer/scanner, a desktop computer, and the like.

At 210, the image capture manager tracks edges that define a document within a field-of-view (FOV) of a camera lens during a camera preview mode. The camera preview mode automatically generated when an application is launched or an option within an application is activated, as discussed above with respect to the FIG. 1. The camera preview mode generates frames that the image capture manager processes to identify the four edges that comprise the document and those four edges are used to track the document within the changing frames.

According to an embodiment, at 211, the image capture manager derives a perimeter rectangle comprised of the edges and tracks the perimeter rectangle within the field of view during operation of the camera.

At 220, the image capture manager derives a guiding rectangle that substantially outlines an available area within the field of view of the camera preview mode. Substantially outlines is intended to mean that the perimeter rectangle is within a predefined percentage of the entire available area of the field of view.

In an embodiment of 211 and 220, at 221, the image capture manager monitors the perimeter rectangle as the perimeter rectangle grows and shrinks within the field of view. That is, as the lens of the camera gets closer to the document the size of the document that appears in the field of view grows and as the lens moves farther away from the document that appears in the field of view shrinks.

In an embodiment, at 222, the image capture manager determines or calculates the guiding rectangle as a rectangle that outlines a perimeter of the available area for the field of view.

In an embodiment, at 223, the image capture manager calculates the guiding rectangle as a rectangle that is a predefined percentage larger in area than a document rectangle defined by the edges of the document and that fits within the available area of the field of view.

At 230, the image capture manager superimposes the guiding rectangle within the field of view. That is, the display of the device presenting the frames being captured by the camera includes a rectangle superimposed within the display that substantially covers a perimeter of the field of view.

According to an embodiment, at 231, the image capture manager provides an animation within the field of view that illustrates moving the camera or the document closer to or farther away from the document or the camera to align the edges of the document within the guiding rectangle depicted within the field of view. That is, if the camera is stationary the animation illustrates moving the document, when the camera is portable and moveable, the animation illustrates moving the camera.

At 240, the image capture manager removes the guiding rectangle from the field of view when the edges of the document substantially align with the guiding rectangle.

In an embodiment, at 241, the image capture manager removes the guiding rectangle when a top leftmost corner of two intersecting edges being tracked for the document is within a predefined pixel distance of a top leftmost corner of the guiding rectangle.

In an embodiment of 241 and at 242, the image capture manager confirms that a calculated center of the document defined within the tracked edges is within the predefined pixel distance of a center of the guiding rectangle.

According to an embodiment, at 250, the image capture manager activates the camera as soon as the tracked edges substantially align with the guiding rectangle and its edges for capturing an optimal document image.

In an embodiment, at 260, the image capture manager presents a button within the field of view that can be touched for activating the camera and capturing an optimal document image as soon as the edges substantially align.

In an embodiment, at 270, the image capture manager captures, by the camera, an optimal document image as soon as the edges substantially align and send the optimal document image over a network connection to an external document processing service for OCR processing and transaction processing using content derived from the OCR processing.

The processing of the image capture manager permits a large document, such as an invoice (8½ inches by 11 inches), to have an image captured of higher pixel quality and resolution by ensuring that the image of the document is captured at a proper and optimal distance from the lens of the camera.

Figure 3:
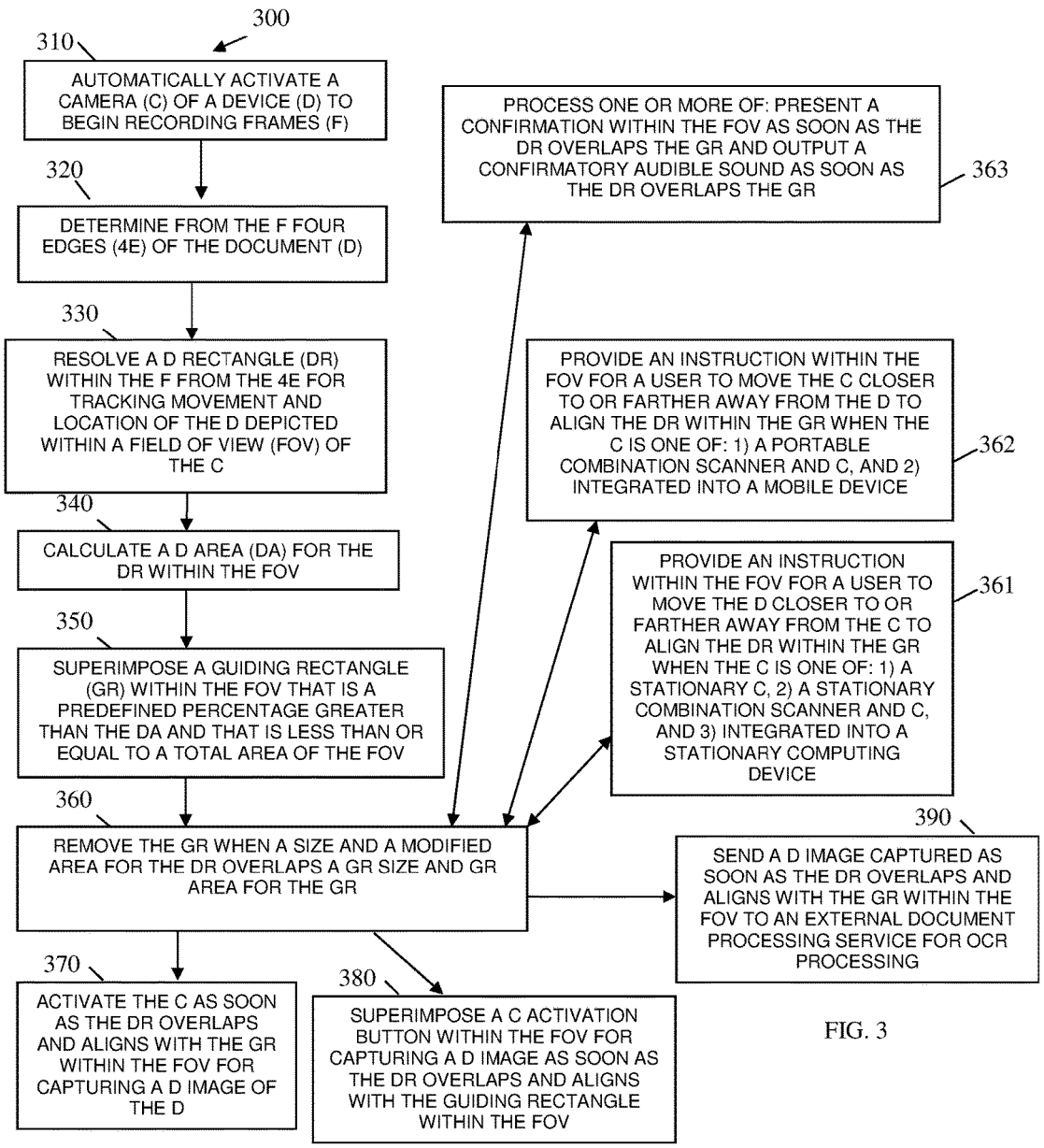
FIG. 3 is a diagram of another method for automatic document image capturing and processing, according to an example embodiment.

FIG. 3 is a diagram of another method 300 for automatic document capturing and processing, according to an example embodiment. The software module(s) that implement the method 300 is referred to herein as an "optimal image capture manager." The optimal image capture manager is implemented as executable instructions and programmed within memory and/or a non-transitory computer-readable (processor-readable) storage medium that executes on one or more processors of a device. The processors of the device are specifically configured to execute the optimal image capture manager. The optimal image capture manager can access one or more networks; the networks can be wired, wireless, or a combination of wired and wireless.

The optimal image capture manager presents another and in some ways enhanced processing perspective of the image capture manager (discussed above with reference to the FIG. 2).

In an embodiment, the optimal image capture manager is the image capture manager of the FIG. 2.

In an embodiment, the device that processes the optimal image capture manager is the mobile device 120. In an embodiment, the mobile device 120 is one of: a phone, a tablet computer, a laptop computer, a wearable processing device, and a device that is part of the IoTs.

In an embodiment, the optimal image capture manager is the document capture manager 121.

In an embodiment, the device that processes the optimal image capture manager is the SST 110. In an embodiment, the SST 110 is one of: a POS terminal operated by a clerk, an ATM, and a kiosk.

In an embodiment, the optimal image capture manager is the document capture manager 112.

The device that executes the optimal image capture manager includes an integrated or interfaced camera. The camera includes video capabilities and still picture taking capabilities. In an embodiment, the camera is a scanner.

In an embodiment, the optimal image capture manager is a subcomponent or integrated module of an application processing on the device where that application is capable of network communication to a remote and external document service, such as a banking/financial service, retail service, accounting service, etc. The application having a user-facing interface for interacting with the user who is operating the device for capturing an image of a document and sending the document image to the external document service for further processing that at least includes OCR processing on the document image to identify document information from the document image.

In an embodiment, the optimal image capture manager executes on a device that also performs the OCR on the document image. In these embodiments, the device that executes the optimal image capture manager can be any of the above-mentioned devices or other devices, such as a standalone printer/scanner, a desktop computer, and the like.

At 310, the optimal image capture manager automatically activates a camera of a device to begin recording frames when a mobile document processing application is activated or when an option within the mobile document processing application is selected for processing.

At 320, the optimal image capture manager determines from the frames four edges of the document.

At 330, the optimal image capture manager resolves a document rectangle within the frames from the four edges for dynamically tracking the movement and locations of the document depicted within a field of view of a camera while the camera is in a camera preview mode of operation.

At 340, the optimal image capture manager calculates a document area for the document rectangle within the field of view.

At 350, the optimal image capture manager superimposes a guiding rectangle within the field of view that is a predefined percentage greater than the document area and that is less than or equal to a total area of the field of view.

At 360, the optimal image capture manager removes the guiding rectangle when a size and a modified area for the document rectangle overlaps and aligns with the guiding rectangle within the field of view for capturing a document image of the document.

According to an embodiment, at 361, the optimal image capture manager provides an instruction within the field of view for a user to move the document closer to or farther away from the camera to align the document rectangle within the guiding rectangle. In this embodiment, the camera is one of: a stationary camera, a stationary combination scanner and camera, and a camera that is integrated into a stationary computing device.

In an embodiment, at 362, the optimal image capture manager provides an instruction within the field of view for a user to move the camera closer to or farther away from the document to align the document rectangle within the guiding rectangle. In this embodiment, the camera is one of: a portable combination scanner and camera, and a camera that is integrated into a mobile device.

In an embodiment, at 363, the optimal image capture manager performs processing for one or more of: presenting a confirmation within the field of view as soon as the document rectangle overlaps the guiding rectangle, and outputting a confirmatory audible sound as soon as the document rectangle overlaps the guiding rectangle.

According to an embodiment, at 370, the optimal image capture manager activates the camera as soon as the document rectangle overlaps and aligns with the guiding rectangle within the field of view for capturing a document image of the document.

In an embodiment, at 380, the optimal image capture manager superimposing a camera activation button within the field of view for capturing a document image as soon as the document rectangle overlaps and aligns with the guiding rectangle within the field of view.

In an embodiment, at 390, the optimal image capture manager sends a document image captured as soon as the document rectangle overlaps and aligns with the guiding rectangle within the field of view to an external document processing service for OCR processing and any subsequent transaction processing.

Figure 4:
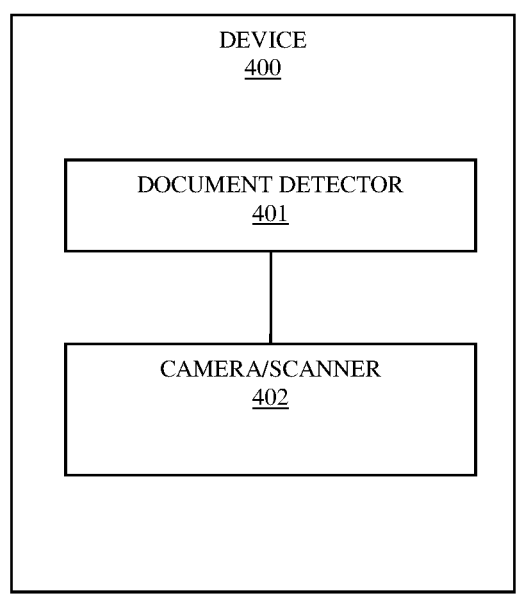
FIG. 4 is a diagram of device that performs automatic document image capturing and processing, according to an example embodiment.

FIG. 4 is a diagram of device 400 that performs automatic document capturing and processing, according to an example embodiment. The components of the device 401 are programmed and reside within memory and/or a non-transitory computer-readable medium and execute on one or more processors of the device 401. The device 401 has access and can communicate over one or more networks; and the networks can be wired, wireless, or a combination of wired and wireless.

In an embodiment, the device 400 performs the processing, inter alia, of the FIGS. 1-3.

In an embodiment, the device 400 is the mobile device 120. In an embodiment, the mobile device 120 is one of: a phone, a tablet computer, a laptop computer, a wearable processing device, and a device that is part of the IoTs.

In an embodiment, the device 400 is the SST 110. In an embodiment, the SST 110 is one of: a POS terminal operated by a clerk, an ATM, and a kiosk.

In an embodiment, the device 400 is a standalone scanner/printer.

In an embodiment, the device 400 is a desktop computer.

The device 400 includes a document detector 401 and a camera/scanner 402.

The document detector 401 is operable to: 1) execute on one or more hardware processors of the device 400, 2) activate the camera/scanner 402 to capture frames from video taken of a document, 3) determine a document rectangle representing the document for tracking within a field of view of the camera/scanner 402 as the frames change, 4) superimpose a guiding rectangle within the field of view that is substantially a size of the field of view, 5) detect when the document rectangle aligns with the guiding rectangle within the field of view, and 6) remove the guiding rectangle and activate the camera/scanner 402 to capture an optimal document image for the document as soon as the document rectangle aligns with the guiding rectangle within the field of view.

In an embodiment, the document detector 401 is the document capture manager 111.

In an embodiment, the document detector 401 is the document capture manager 121.

In an embodiment, the document detector 401 is the image capture manager of the FIG. 2.

In an embodiment, the document detector 401 is the optimal image capture manager of the FIG. 3.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   tracking edges that define a document within a field of view of a camera;
   deriving a guiding rectangle that substantially outlines an available area within the field of view;
   superimposing the guiding rectangle within the field of view; and
   removing the guiding rectangle from the field of view when the edges of the document substantially align with the guiding rectangle, including when a top leftmost corner of two intersecting edges is within a predefined pixel distance of a top leftmost corner of the guiding rectangle.

2. The method of claim 1 further comprising, activating the camera as soon as the edges substantially align for capturing an optimal document image.

3. The method of claim 1 further comprising, presenting a button within the field of view that can be touched for activating the camera and capturing an optimal document image as soon as the edges substantially align.

4. The method of claim 1 further comprising, capturing, by the camera, an optimal document image as soon as the edges substantially align and sending the optimal image over a network connection to an external document processing service for Optical Character Recognition (OCR) processing.

5. The method of claim 1, wherein tracking further includes deriving a perimeter rectangle comprised of the edges and tracking the perimeter rectangle within the field of view during operation of the camera.

6. The method of claim 5, wherein deriving further includes monitoring the perimeter rectangle as the perimeter rectangle grows and shrinks within the field of view.

7. The method of claim 1, wherein deriving further includes determining the guiding rectangle as a rectangle that outlines a perimeter of the available area for the field of view.

8. The method of claim 1, wherein deriving further includes calculating the guiding rectangle as a rectangle that is a predefined percentage larger in area than a document rectangle defined by the edges or the document and that fits within the available area of the field of view.

9. The method of claim 1, wherein superimposing further includes providing an animation within the field of view illustrating moving the camera or the document closer to or farther away from the document or the camera to align the edges of the document with the guiding rectangle depicted within the field of view.

10. The method of claim 1, wherein removing further includes confirming that a calculated center of the document defined within the edges is within the predefined pixel distance of a center of the guiding rectangle.

11. A method, comprising:
  automatically activating a camera of a device to begin recording frames;
  determining from the frames four edges of a document;
  resolving a document rectangle within the frames from the four edges for tracking movement and location of the document depicted within a field of view of the camera;
  calculating a document area for the document rectangle within the field of view;
  superimposing a guiding rectangle within the field of view that is a predefined percentage greater than the document area and that is less than or equal to a total area of the field of view; and
  removing the guiding rectangle when a size and a modified area for the document rectangle overlaps a guiding rectangle size and guiding rectangle area for the guiding rectangle, including when a top leftmost corner of two intersecting edges is within a predefined pixel distance of a top leftmost corner of the guiding rectangle.

12. The method of claim 11 further comprising, activating the camera as soon as the document rectangle overlaps and aligns with the guiding rectangle within the field of view for capturing a document image of the document.

13. The method of claim 11 further comprising, superimposing a camera activation button within the field of view for capturing a document image as soon as the document rectangle overlaps and aligns with the guiding rectangle within the field of view.

14. The method of claim 11 further comprising, sending a document image captured as soon as the document rectangle overlaps and aligns with the guiding rectangle within the field of view to an external document processing service for Optical Character Recognition (OCR) processing.

15. The method of claim 11, wherein removing further includes providing an instruction within the field of view for a user to move the document closer to or farther away from the camera to align the document rectangle within the guiding rectangle when the camera is one of: 1) a stationary camera, 2) a stationary combination scanner and camera, and 3) integrated into a stationary computing device.

16. The method of claim 11, wherein removing further includes providing an instruction within the field of view for a user to move the camera closer to or farther away from the document to align the document rectangle within the guiding rectangle when the camera is one of: 1) a portable combination scanner and camera, and 2) integrated into a mobile device.

17. The method of claim 11, wherein removing further includes one or more of: presenting a confirmation within the field of view as soon as the document rectangle overlaps the guiding rectangle and outputting a confirmatory audible sound as soon as the document rectangle overlaps the guiding rectangle.

18. A device, comprising:
  a camera/scanner integrated into the device; and
  a document detector operable to:
  (i) execute on one or more hardware processors of the device,
  (ii) activate the camera/scanner to capture frames from video taken of a document,
  (iii) determine a document rectangle representing the document for tracking within a field of view of the camera/scanner as the frames change,
  (iv) superimpose a guiding rectangle within the field of view that is substantially a size of the field of view,
  (v) detect when the document rectangle aligns with the guiding rectangle within the field of view, and
  (vi) remove the guiding rectangle and activate the camera/scanner to capture an optimal document image for the document as soon as the document rectangle aligns with the guiding rectangle within the field of view, including when a top leftmost corner of two intersecting edges is within a predefined pixel distance of a top leftmost corner of the guiding rectangle.

19. The device of claim 18, wherein the device is one of: a phone, a tablet, a wearable processing device, a laptop, an Automated Teller Machine (ATM), a network camera, a desktop computer, a kiosk, a standalone printer/scanner, and a Point-Of-Sale (POS) terminal.

* * * * *